United States Patent
Hill et al.

(10) Patent No.: US 11,487,998 B2
(45) Date of Patent: Nov. 1, 2022

(54) DEPTH-FIRST CONVOLUTION IN DEEP NEURAL NETWORKS

(71) Applicant: QUALCOMM Incorporated, San Diego, CA (US)

(72) Inventors: Rexford Alan Hill, San Diego, CA (US); Sruthikesh Surineni, San Diego, CA (US); Adrienne Milner, San Diego, CA (US); Vito Bica, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 807 days.

(21) Appl. No.: 16/443,695

(22) Filed: Jun. 17, 2019

(65) Prior Publication Data
US 2020/0394500 A1    Dec. 17, 2020

(51) Int. Cl.
*G06N 3/04* (2006.01)
*G06F 17/15* (2006.01)
*G06K 9/62* (2022.01)

(52) U.S. Cl.
CPC ......... *G06N 3/0472* (2013.01); *G06F 17/15* (2013.01); *G06K 9/6267* (2013.01); *G06N 3/04* (2013.01); *G06N 3/0454* (2013.01); *G06N 3/0481* (2013.01)

(58) Field of Classification Search
None
See application file for complete search history.

(56) References Cited

U.S. PATENT DOCUMENTS

| | | | |
|---|---|---|---|
| 10,706,330 B2 * | 7/2020 | Gope | G06V 20/56 |
| 2017/0300786 A1 * | 10/2017 | Gope | G06T 5/002 |
| 2018/0307983 A1 | 10/2018 | Srinivasa et al. | |
| 2018/0349477 A1 * | 12/2018 | Jaech | G06F 16/3334 |
| 2019/0044942 A1 * | 2/2019 | Gordon | H03M 1/12 |
| 2019/0180154 A1 * | 6/2019 | Orlov | G06V 10/768 |
| 2019/0354837 A1 * | 11/2019 | Zhou | G06N 3/0445 |
| 2020/0104690 A1 | 4/2020 | Bai et al. | |

FOREIGN PATENT DOCUMENTS

| | | |
|---|---|---|
| CN | 110378468 A | 10/2019 |
| WO | 2018217829 A1 | 11/2018 |

OTHER PUBLICATIONS

Alwani M., et al., "Fused-Layer CNN Accelerators," 49th Annual IEEE/ACM International Symposium on Microarchitecture (MICRO), IEEE, 2016, 12 pages.

(Continued)

*Primary Examiner* — Tsung Yin Tsai
(74) *Attorney, Agent, or Firm* — Edward J. Meisarosh

(57) ABSTRACT

In one embodiment, a depth-first deep convolutional network (DCN) having a first convolutional layer having a first first-layer kernel and adapted to convolve a first input and a second convolutional layer having a first second-layer kernel and adapted to convolve a second-layer input. A method for the DCN includes initiating convolution in the first convolution layer of the first input tensor with the first first-layer kernel to generate a value strip for the second input tensor and, prior to completion of the convolution in the first convolution layer, initiating convolution in the second convolution layer of the second input with the first second-layer kernel to generate a value strip for a third layer.

22 Claims, 7 Drawing Sheets

(56) References Cited

OTHER PUBLICATIONS

International Search Report and Written Opinion—PCT/US2020/038081—ISA/EPO—dated Sep. 25, 2020.
Koen G., et al., "Breaking High-Resolution CNN Bandwidth Barriers With Enhanced Depth-First Execution," IEEE Journal on Emerging and Selected Topics In Circuits and Systems, IEEE, Piscataway, NJ, USA, vol. 9, No. 2, Jun. 11, 2019 (Jun. 11, 2019), pp. 323-331, XP011729341, ISSN: 2156-3357, DOI: 10.1109/JETCAS.2019.2905361 [retrieved on Jun. 11, 2019] abstract; figures 1-5 p. 323, left-hand column, line 1—p. 330, right-hand column, last line.

* cited by examiner

US 11,487,998 B2

DEPTH-FIRST CONVOLUTION IN DEEP NEURAL NETWORKS

FIELD OF THE DISCLOSURE

The present disclosure generally relates to artificial neural networks and, more particularly, to convolution in deep neural networks.

DESCRIPTION OF RELATED ART

An artificial neural network, which may be composed of an interconnected group of artificial neurons (e.g., neuron models), may be computational device or a representation of a method performed by a computational device. Neural networks may be used for various applications and/or devices, such as Internet Protocol (IP) cameras, Internet of Things (IoT) devices, autonomous vehicles, and/or service robots.

Individual artificial neurons, or nodes, in the artificial neural network may emulate biological neurons by taking input data and performing simple operations on the data. The results of the simple operations performed on the input data are selectively passed on to other nodes. Weight values are associated with each node in the network, and these values constrain how input data is related to output data. For example, the inputs of each node may be multiplied by corresponding weight values, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks exist, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label.

Convolutional neural networks (CNNs) are a type of feed-forward artificial neural network. Convolutional neural networks may include collections of artificial neurons that each have a receptive field (e.g., a spatially localized region of an input space) and that collectively tile an input space with overlapping tiles. Convolutional neural networks have numerous applications. In particular, CNNs have broadly been used in the area of pattern recognition and classification. One type of convolutional neural network is a deep convolutional network (DCN). A deep neural network is a neural network that has multiple hidden layers between the input and output layers.

In layered neural network architectures (e.g., MLP and DCN), the output of a first layer of artificial neurons becomes an input to a second layer of artificial neurons, the output of the second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation. As noted above, training is a phase in which weight values for a neural network are adjusted and set so that the neural networks becomes able to identify particular classes by learned input data characteristics. After a neural network has been trained, it may be used for inference, where the set weight values are used by the network to classify new inputs.

Training is a computationally intensive process that is typically performed on server systems as edge devices (e.g., mobile computing device or smart phone) generally lack the memory, computational, and power resources to practically perform training. Inferencing is significantly less-intensive computationally and may be reasonably done by edge devices. A trained model may be used for inference without further training. Note, however, that although further training is not necessary, a trained model may nevertheless be further fine tuned with new input from the inferencing device itself or from an external input. Although inferencing is computationally less-intensive than training, it nevertheless is computationally intensive relative to other tasks performed by a mobile computing device and systems and methods to reduce the computational burden are desirable.

SUMMARY

Certain aspects of the present disclosure are directed to a computer-implemented method for using a deep convolutional network. The deep convolutional network comprises a first convolutional layer configured to use a first-layer kernel for convolving a first-layer input tensor to generate a second-layer input tensor, a second convolutional layer configured to use a second-layer kernel for convolving the second-layer input tensor to generate a third-layer input tensor, and a third layer configured to receive the third-layer input tensor. The first-layer kernel has a first-layer-kernel length and a first-layer-kernel width. The first-layer input tensor has a first-layer-input length and a first-layer-input width. The second-layer input tensor has a second-layer-input length and a second-layer-input width. The second-layer kernel has a second-layer-kernel length and a second-layer-kernel width. The method comprises convolving the first-layer kernel with a first first-layer stretched receptive field of the first input tensor to generate values for a first strip of the second-layer input tensor, subsequently convolving the second-layer kernel with a first second-layer stretched receptive field of the second input tensor to generate values for a first strip of the third-layer input tensor, and subsequently convolving the first-layer kernel with a second first-layer stretched receptive field of the first input tensor to generate values for a second strip of the second-layer input tensor. The first-layer receptive fields have a length equal to the first-layer-kernel length and a first-layer-stretched-receptive-field width that is greater than the first-layer-kernel width. The second-layer receptive fields have a length equal to the second-layer-kernel length and a second-layer-stretched-receptive-field width that is greater than the second-layer kernel width.

Certain aspects of the present disclosure are directed to a computing device for using a deep convolutional network. The deep convolutional network comprises a first convolutional layer configured to use a first-layer kernel for convolving a first-layer input tensor to generate a second-layer input tensor, a second convolutional layer configured to use a second-layer kernel for convolving the second-layer input tensor to generate a third-layer input tensor, and a third layer configured to receive the third-layer input tensor. The first-layer kernel has a first-layer-kernel length and a first-layer-kernel width. The first-layer input tensor has a first-layer-input length and a first-layer-input width. The second-layer input tensor has a second-layer-input length and a second-layer-input width. The second-layer kernel has a second-layer-kernel length and a second-layer-kernel width. The computing device is configured to convolve the first-layer kernel with a first first-layer stretched receptive field of the first input tensor to generate values for a first strip of the second-layer input tensor, subsequently convolve the second-layer kernel with a first second-layer stretched receptive field of the second input tensor to generate values for a first strip of the third-layer input tensor, and subsequently convolve the first-layer kernel with a second first-layer stretched receptive field of the first input tensor to generate values for a second strip of the second-layer input tensor. The first-layer receptive fields have a length equal to the first-layer-kernel length and a first-layer-stretched-receptive-field width that is greater than the first-layer-kernel width. The second-layer receptive fields have a length equal to the second-layer-kernel length and a second-layer-stretched-receptive-field width that is greater than the second-layer kernel width.

Certain aspects of the present disclosure are directed to a computing device for using a deep convolutional network. The deep convolutional network comprises a first convolutional layer configured to use a first-layer kernel for convolving a first-layer input tensor to generate a second-layer input tensor, a second convolutional layer configured to use a second-layer kernel for convolving the second-layer input tensor to generate a third-layer input tensor, and a third layer configured to receive the third-layer input tensor. The first-layer kernel has a first-layer-kernel length and a first-layer-kernel width. The first-layer input tensor has a first-layer-input length and a first-layer-input width. The second-layer input tensor has a second-layer-input length and a second-layer-input width. The second-layer kernel has a second-layer-kernel length and a second-layer-kernel width. The computing device comprises means for convolving the first-layer kernel with a first first-layer stretched receptive field of the first input tensor to generate values for a first strip of the second-layer input tensor, means for subsequently convolving the second-layer kernel with a first second-layer stretched receptive field of the second input tensor to generate values for a first strip of the third-layer input tensor, and means for subsequently convolving the first-layer kernel with a second first-layer stretched receptive field of the first input tensor to generate values for a second strip of the second-layer input tensor. The first-layer receptive fields have a length equal to the first-layer-kernel length and a first-layer-stretched-receptive-field width that is greater than the first-layer-kernel width. The second-layer receptive fields have a length equal to the second-layer-kernel length and a second-layer-stretched-receptive-field width that is greater than the second-layer kernel width.

Certain aspects of the present disclosure are directed to a non-transitory computer-readable medium comprising instructions that, when executed by at least one processor, cause the processor to perform a method for using a deep convolutional network. The deep convolutional network comprises a first convolutional layer configured to use a first-layer kernel for convolving a first-layer input tensor to generate a second-layer input tensor, a second convolutional layer configured to use a second-layer kernel for convolving the second-layer input tensor to generate a third-layer input tensor, and a third layer configured to receive the third-layer input tensor. The first-layer kernel has a first-layer-kernel length and a first-layer-kernel width. The first-layer input tensor has a first-layer-input length and a first-layer-input width. The second-layer input tensor has a second-layer-input length and a second-layer-input width. The second-layer kernel has a second-layer-kernel length and a second-layer-kernel width. The method comprises convolving the first-layer kernel with a first first-layer stretched receptive field of the first input tensor to generate values for a first strip of the second-layer input tensor, subsequently convolving the second-layer kernel with a first second-layer stretched receptive field of the second input tensor to generate values for a first strip of the third-layer input tensor, and subsequently convolving the first-layer kernel with a second first-layer stretched receptive field of the first input tensor to generate values for a second strip of the second-layer input tensor. The first-layer receptive fields have a length equal to the first-layer-kernel length and a first-layer-stretched-receptive-field width that is greater than the first-layer-kernel width. The second-layer receptive fields have a length equal to the second-layer-kernel length and a second-layer-stretched-receptive-field width that is greater than the second-layer kernel width.

Additional aspects, advantages, and features of the present disclosure may become apparent after review of the entire application.

DETAILED DESCRIPTION

With reference to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
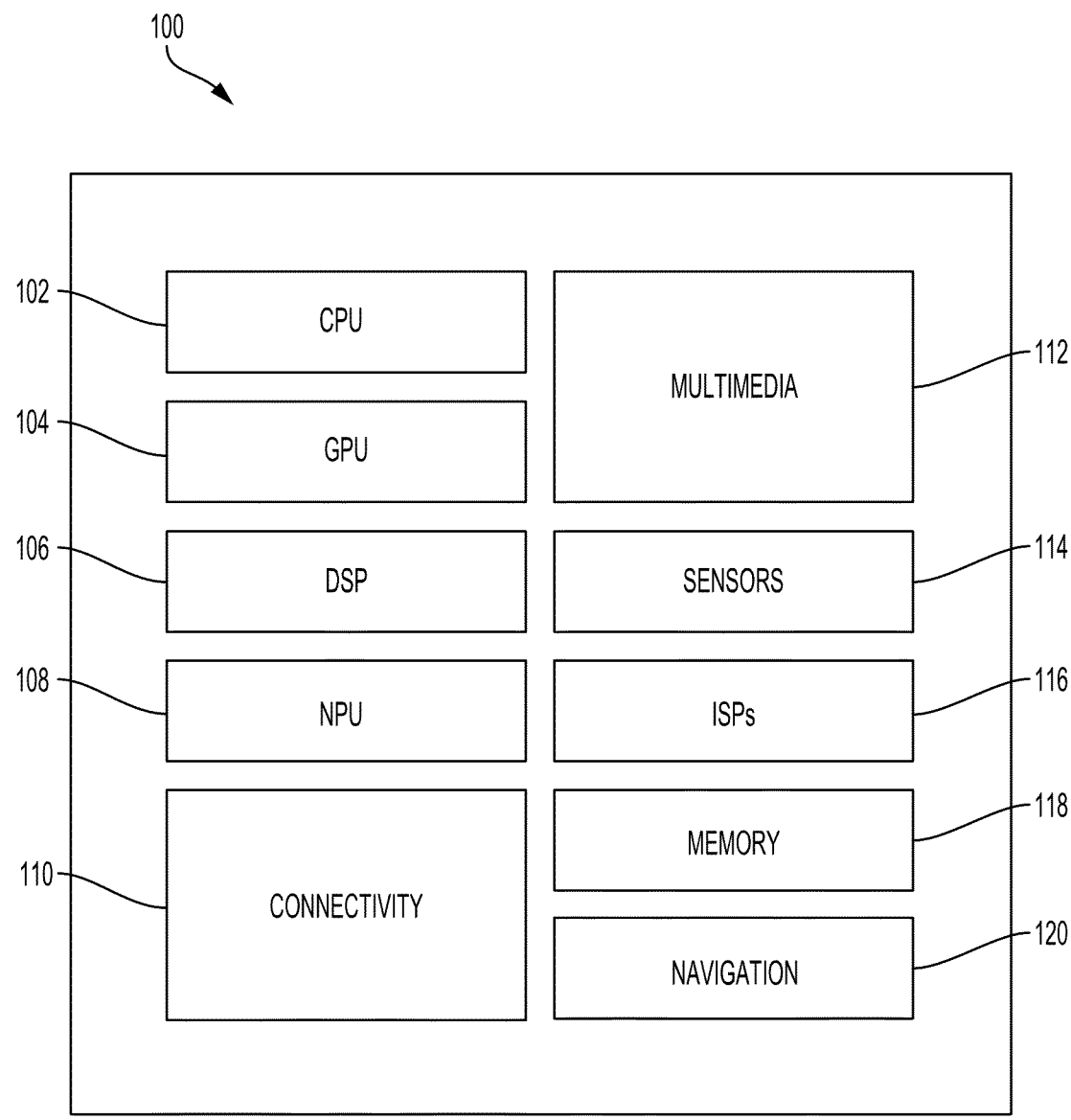
FIG. 1 is a schematic diagram of an exemplary system-on-a-chip (SoC) that may be used to implement embodiments of the disclosure.

FIG. 1 is a schematic diagram of an exemplary system-on-a-chip (SoC) 100, which may be used to implement embodiments of the disclosure. The SoC 100 comprises one or more of a central processing unit (CPU) 102 or a multi-core CPU, a graphics processing unit (GPU) 104, a digital signal processor (DSP) 106, a neural processing unit (NPU) 108, a connectivity block 110, a multimedia processor 112, a sensor processor 114, image signal processors (ISPs) 116, a memory block 118, and an optional navigation module 120.

Variables (e.g., node inputs and weights), data, instructions, system parameters, etc., may be stored in a memory block associated with the NPU 108, in a memory block associated with the CPU 102, in a memory block associated with the GPU 104, in a memory block associated with the DSP 106, in the memory block 118, or may be distributed across multiple blocks.

The connectivity block 110 may include fifth generation (5G) connectivity, fourth generation long term evolution (4G LTE) connectivity, Wi-Fi connectivity, USB connectivity, Bluetooth connectivity, and the like. The multimedia processor 112 may, for example, detect and recognize gestures. In one implementation, the NPU is implemented in the CPU 102, DSP 106, and/or GPU 104. The navigation module 120 may include a global positioning system.

The SoC 100 and/or components thereof may be configured to perform depth-first convolution operations according to aspects of the present disclosure discussed below. By using depth-first convolution, a computing device may increase inferencing efficiency allowing the device to reduce the number of data-transfer (e.g. read and write) operations, process larger inputs (e.g., images) with existing hardware, and/or use less hardware to process conventionally sized inputs.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine-learning approach to an object recognition problem may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. Higher (i.e., subsequent) layers, taking the output of lower (i.e., earlier) layers as input, may learn to recognize combinations of features, such as simple shapes for visual data or combinations of sounds for auditory data. For instance, higher layers may learn to represent complex shapes in visual data or words in auditory data. Still-higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize, e.g., cars, trucks, and/or airplanes.

Neural networks may be designed with a variety of connectivity patterns. In feed-forward networks, information is passed from lower to higher layers, with each neuron in a lower layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
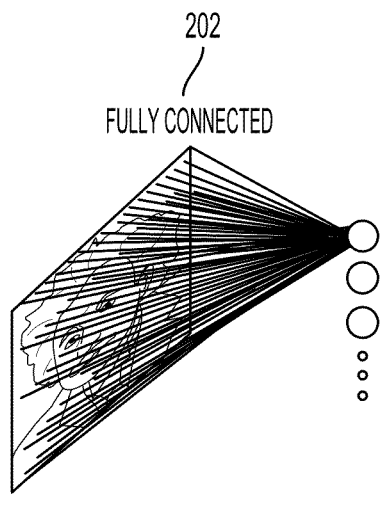
FIG. 2A is an illustration of an exemplary fully connected neural-network layer.
Figure 2B:
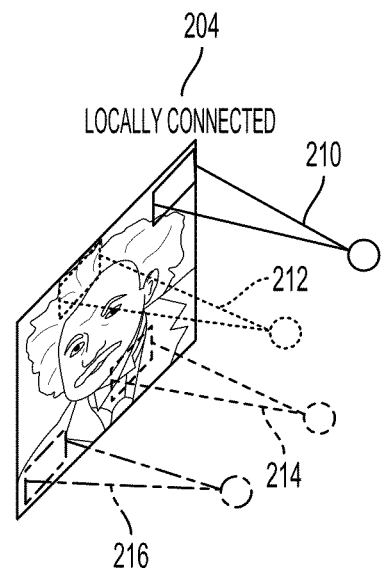
FIG. 2B is an illustration of an exemplary locally connected neural-network layer.

The connections between layers of a neural network may be fully connected or locally connected. FIG. 2A illustrates an example of a fully connected neural network segment 202. In a fully connected neural network segment 202, a neuron in a first layer may communicate its output to every neuron in a second layer, so that each neuron in the second layer will receive input from every neuron in the first layer. FIG. 2B illustrates an example of a locally connected neural network segment 204. In a locally connected neural network segment 204, a neuron in a first layer may be connected to a limited number of neurons in the second layer. More generally, a locally connected layer of the locally connected neural network segment 204 may be configured so that each neuron in a layer will have the same or a similar connectivity pattern, but with connections strengths that may have different values (e.g., 210, 212, 214, and 216). The locally connected connectivity pattern may give rise to spatially distinct regions in a higher layer, because the higher layer neurons in a given region may receive inputs that are tuned through training to the properties of a restricted portion of the total input to the network.

Figure 2C:
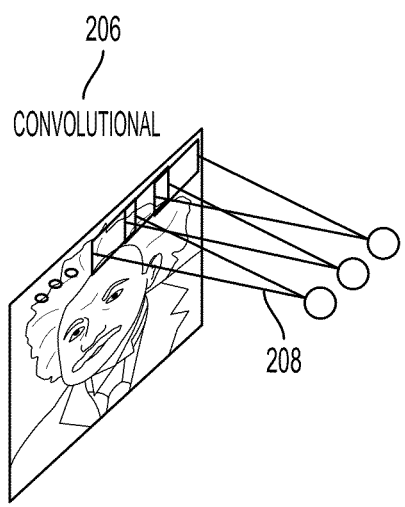
FIG. 2C is an illustration of an exemplary convolutional neural-network layer.

One example of a locally connected neural network is a convolutional neural network. FIG. 2C illustrates an example of a convolutional neural network segment 206. The convolutional neural network segment 206 may be configured such that the connection strengths associated with the inputs for each neuron in the second layer are shared (e.g., 208). Convolutional neural networks may be well suited to problems in which the spatial location of inputs is meaningful. Convolutional neural network segment 206 may be used according to aspects of the present disclosure.

Figure 2D:
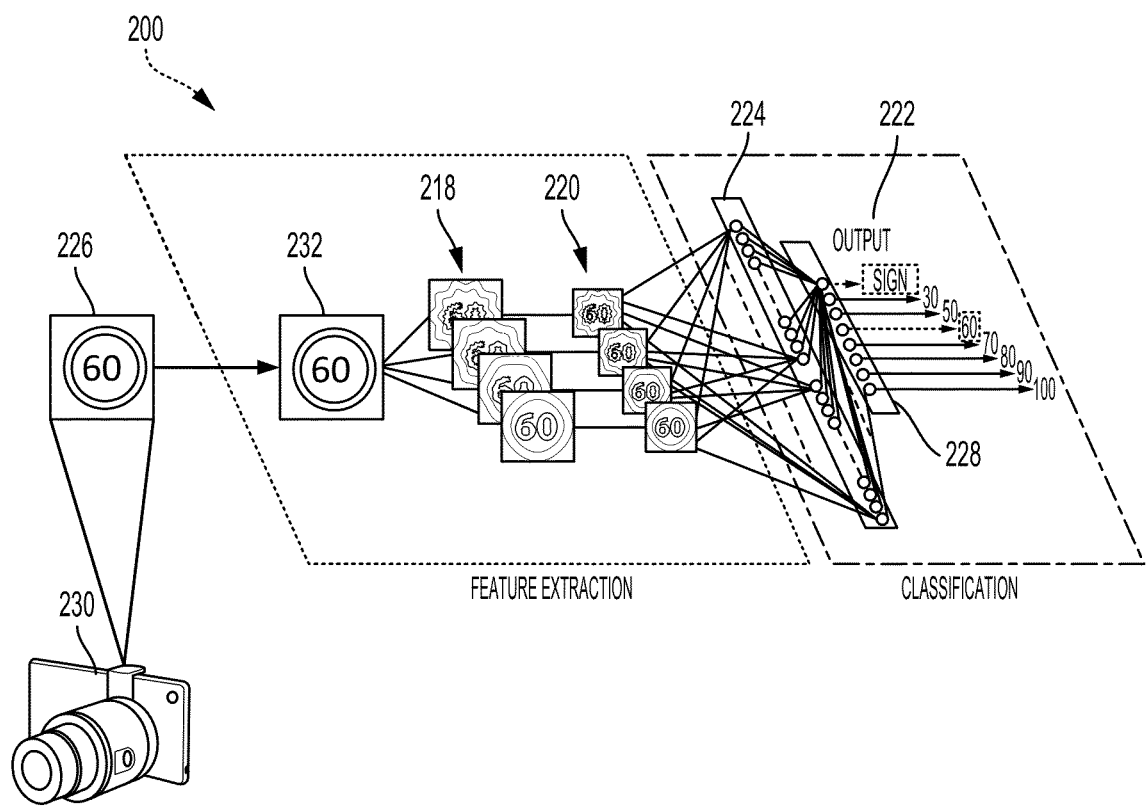
FIG. 2D is an illustration of a detailed exemplary of a deep convolutional network (DCN) designed to recognize visual features from an image.

FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with a tensor representation of an image, such as an image 226 of a speed limit sign, and a forward pass may then be computed to produce an output 222. A tensor representation of an image may comprise, for each pixel of the image, information representing color and brightness information for the pixel. Note that, herein, the term image may be used as shorthand for the tensor representation of the image. The DCN 200 may include a feature extraction section and a classification section. Upon receiving the image 226, a convolutional layer 232 may apply convolutional kernels (not shown) to the tensor to generate a first set of feature maps 218. As an example, the convolutional kernel for the convolutional layer 232 may be a 5×5 kernel that generates 28×28 feature maps. In the present example, four different feature maps are generated in the first set of feature maps 218 because four different convolutional kernels were applied to the image 226 at the convolutional layer 232. The convolutional kernels may also be referred to as filters or convolutional filters.

The first set of feature maps 218 may be subsampled by a pooling layer (not shown) to generate a second set of feature maps 220. The pooling may be, for example, max pooling, which selects only the maximum value of a group of inputs, or average pooling, which selects only the average value of a group of inputs. The pooling layer reduces the size of each of the first set of feature maps 218. That is, a size of each of the second set of feature maps 220, such as 14×14, is smaller than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is fully connected and flattened to generate a first feature vector 224. Furthermore, the first feature vector 224 is fully connected to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x), by a rectified linear unit (ReLU). A ReLU functions to filter out any negative values, which are replaced with zeroes. Values from adjacent neurons may be further pooled, which corresponds to down sampling, and may provide additional local invariance and dimensionality reduction.

Figure 3:
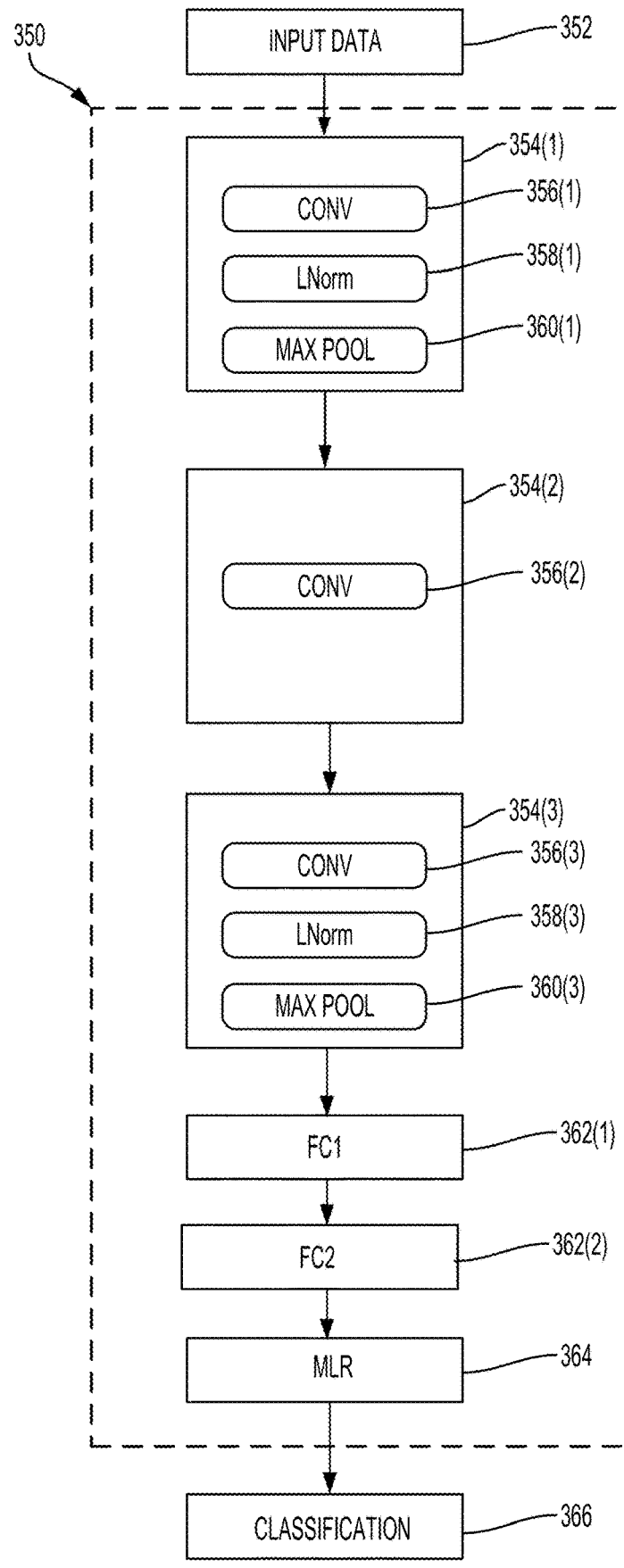
FIG. 3 is a block-diagram illustration of an exemplary deep convolutional network (DCN).

FIG. 3 is a block diagram illustrating an exemplary deep convolutional network 350. The deep convolutional network 350 may include multiple different types of layers based on connectivity and weight sharing. As shown in FIG. 3, the deep convolutional network 350 includes three convolution blocks 354—namely convolution blocks 354(1), 354(2), and 354(3). Each convolution block 354 comprises a corresponding convolution layer (CONV) layer 356 and may optionally comprise a normalization layer (LNorm) 358 and a max pooling layer (MAX POOL) 360. For example, convolution block 354(1) includes CONV 356(1), LNorm 358(1), and MAX POOL 360(1), while convolution block 354(2) includes convolution layer 356(1) but no corresponding normalization layer or max pooling layer.

A convolution layer 356 may include one or more convolutional filters (kernels), each of which comprises a set of weights that may be applied to an input tensor, such as input data 352, to generate a corresponding feature map (not shown), which is also a tensor. As further described below, the convolutional application of a kernel to an input tensor involves sweeping the kernel over the input tensor, multiplying the weights of the kernel by the corresponding values of the input tensor, and adding the products to generate a corresponding value for the resultant feature map. A convolution layer 356 may include, or be immediately succeeded by, a non-linear activation layer (not shown) performing a non-linearity function such as, for example, non-linear rectification (ReLU), a step function, a sigmoid function, or a tanh function. Performing a non-linearity function helps improve the accuracy and efficiency of the DCN 350.

A normalization layer 358 may normalize each of the feature maps output by the preceding convolution filters. For example, a normalization layer 358 may provide whitening or lateral inhibition. The max pooling layer 360 may select for propagation only the maximum value of a cluster of inputs to provide down-sampling aggregation over space for local translation invariance. In other words, max pooling allows the maximum activation of a receptive field to characterize the entire receptive field without regard to the precise location within the receptive field of that maximum activation. Note that other down-sampling layers—such as, for example, an average pooling layer—may be used instead of any max pooling layer 360.

Although only three convolution blocks 354(1)-(3) are shown in FIG. 3, the present disclosure is not so limited, and alternatively, any number of convolution blocks 354, with any combination of constituent layers, may be included in the deep convolutional network 350.

The deep convolutional network 350 may also include one or more fully connected layers 362, such as layer 362(1) (labeled "FC1") and layer 362(2) (labeled "FC2"). The fully connected layers are used for flattening and classification, as described above in reference to FIG. 2D. The deep convolutional network 350 may further include a multinomial logistic regression (MLR) layer 364, which may, for example, implement a softmax function to provide probabilities for each of a set of output classification features.

The transformations between any two consecutive layers of layers 356, 358, 360, 362, 364 of the deep convolutional network 350 are based on weights and biases (not shown) that are updated during training. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied to the first of the convolution blocks 354(1). The output of the deep convolutional network 350 is a classification 366 for the input data 352. The classification 366 may be a set of probabilities, where each probability is the probability of the input data including a feature from a set of classification features.

In an exemplary conventional processing of an image by DCN 350, the image data would be retrieved from a relatively-low-speed holding memory, such as an off-chip DRAM module, and uploaded to a relatively-high-speed operational memory, such as tightly-coupled memory (TCM) (not shown) of NPU 108, or other local memory, and provided as input data 352. TCM may be implemented as, for example, static random-access memory (SRAM). In addition to the image data, the weights for the kernels of the first convolutional layer 356(1) would also be retrieved from the holding memory into the operational memory. Following the retrievals, the entire image would be convolved using the kernels of convolutional layer 356(1) of convolutional block 354(1), with the results filtered by a corresponding ReLU, normalized by the normalization layer 358(1), and aggregated by the max pooling layer 360(1) to generate feature maps that will form the input for convolutional block 354(2). During the processing of the convolutional block 354(1), these feature maps get written to the holding memory. After the processing of the input data 352 by the convolutional block 354(1) is complete, these feature maps are retrieved from the holding memory and uploaded into the operational memory for processing by the convolutional block 354(2). This processing requires large operational memories for processing large input tensors and large weight tensors. In addition, the back-and-forth movement of data between the holding memory and the operational memory is resource-intensive, limits performance, and consumes power.

In one aspect of the disclosure, depth-first convolution is used to minimize the size of the operational memory needed for processing inputs of a particular size and minimize memory bandwidth used for transferring data between the holding memory and the operational memory. Depth-first convolution involves starting the convolutional processing of a next convolutional layer before the convolutional processing of the current layer is completed. In addition, input values are uploaded as needed for currently processing receptive fields and discarded when no-longer needed, prior to termination of the convolution of the present layer.

Figure 4:
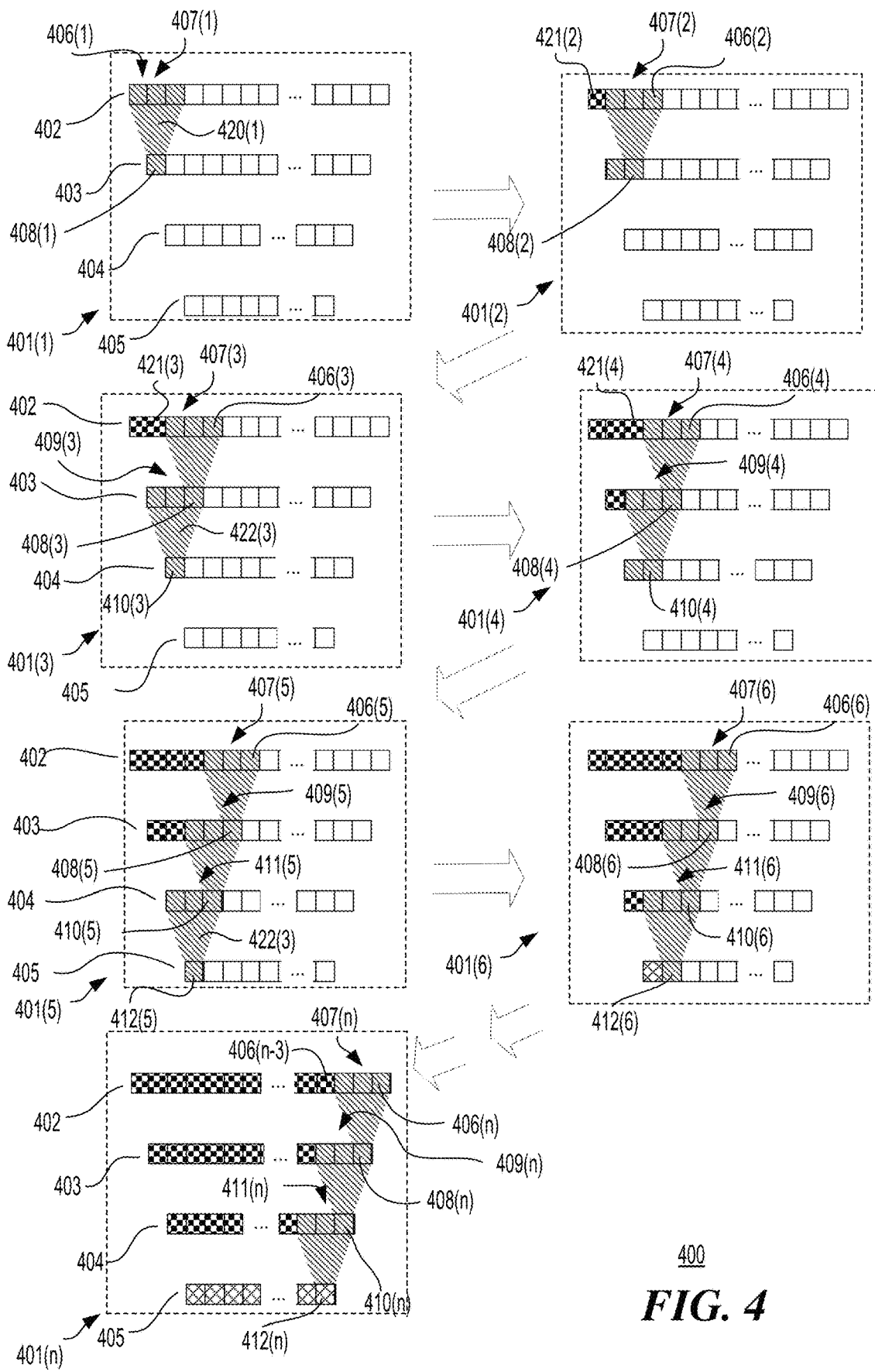
FIG. 4 is an illustration of an exemplary progression of several stages of depth-first convolution processing of 1-dimensional convolutional layers in a DCN in accordance with an embodiment of this disclosure.

FIG. 4 is an illustration of an exemplary progression 400 of several stages of depth-first convolution processing of 1-dimensional convolutional layers in a DCN 401, shown in several stages DCN(n), as described below. The DCN 401 comprises layers 402, 403, 404, and 405. Each of the layers 402, 403, and 404 is a layer that performs local filtering such as, for example, convolution, pooling, or elementwise filtering. Layers 402, 403, 404, and 405 may have, between any two adjoining layers, intervening layers (not shown) such as, for example, non-linearity, normalization, and/or pooling layers.

Note that layers 402, 403, 404, and 405 are represented in FIG. 4 by their input vectors. In one embodiment, the layers 402, 403, 404, and 405 correspond to the layers 356(1), 356(2), 356(3) and 362(1) of FIG. 3, where the layers 402, 403, and 404 are convolutional layers. In one embodiment, Layer 402 uses 3-tap (i.e., 3-weight) kernels (not shown) for convolving with corresponding 3-element receptive fields 407 of the input vector.

In a first stage of processing the DCN 401(1), three elements 406(1) of the input vector for the layer 402 are read into the operational memory from the holding memory to form a receptive field 407(1). In addition the weights of the kernels for layer 402 are read into the operational memory from the holding memory. The receptive field 407(1) is matrix-multiplied with a first kernel of layer 402 to generate an output value 408(1) for the layer 403. This processing may be visually represented by a two-dimensional diagonally patterned funnel 420(1) whose base is the receptive field 407(1) and whose apex or stem is the output value 408(1). In general, any local filtering step, such as convolution or pooling, may be visually represented as a cone or funnel whose base is the receptive field and whose apex or stem is the output.

Note that the layer 402 uses a stride of one element. In a subsequent second stage of processing DCN 401(2), a next element 406(2) of the input vector for the layer 402 is read into operational memory from the holding memory to form the next receptive field 407(2), which is illustrated as shifted by one element relative to the receptive field 407(1) of the first stage DCN 401(1). The receptive field 407(2) is then matrix-multiplied by the first kernel of layer 402 to generate an output value 408(2) for the layer 403. Since the first value 421(2) of the input vector for layer 402 is no longer needed, its spot (illustrated in a checkerboard pattern) in the operational memory may be freed and reused for any other element.

In a subsequent third stage of processing DCN 401(3), a next element 406(3) of the input vector for the layer 402 is read into the operational memory from the holding memory to form the next receptive field 407(3), which is then matrix-multiplied by the first kernel of layer 402 to generate an output value 408(3) for the layer 403. The operational-memory spot for the second element 421(3) of the input vector for the layer 402 may be freed and reused. Layer 403 also uses 3-tap kernels (not shown). Now that values 408(1)-(3) have been determined, they form a receptive field 409(3), which is then matrix-multiplied by a first kernels of layer 403 to generate an output value 410(3) for the layer 404. This processing is illustrated by a diagonally patterned funnel 422(3).

In a subsequent fourth stage of processing DCN 401(4), a next element 406(4) of the input vector for the layer 402 is read into the operational memory from the holding memory to form the next receptive field 407(4), which is then matrix-multiplied by the first kernel of layer 402 to generate an output value 408(4) for the layer 403. The operational-memory spot for the third element 421(4) of the input vector for the layer 402 may be freed and reused. Using newly generated value 408(4), receptive field 409(4) is matrix-multiplied by the first kernel of layer 403 to generate an output value 410(4) for the layer 404. The operational-memory spot for the value 408(1) (now illustrated with a checkerboard pattern) may now be freed and reused.

In a subsequent fifth stage of processing DCN 401(5), a next element 406(5) of the input vector for the layer 402 is read into the operational memory to form the next receptive field 407(5), which is matrix-multiplied by the first kernel of layer 402 to generate an output value 408(5) for the layer 403. The operational-memory spot used by the element 406(2) of the input vector may now be freed and reused. Using the newly generated value 408(5), the receptive field 409(5) of layer 403 is matrix-multiplied by the first kernel of layer 403 to generate an output value 410(5) for the layer 404. The operational-memory spot for the value 408(2) may be freed and reused. Layer 404 also uses 3-tap kernels (not shown). Now that values 410(3)-(5) of layer 404 have been determined, they form receptive field 411(5), which is matrix-multiplied by the first kernel of layer 404 to generate an output value 412(5) for the layer 405. This processing is illustrated by the diagonally patterned funnel 423(5).

In a subsequent sixth stage of processing DCN 401(6), a next element 406(6) of the input vector for the layer 402 is read into the operational memory to form the next receptive field 407(6), which is matrix-multiplied by the first kernel of layer 402 to generate an output value 408(6) for the layer 403. The operational-memory spot for the element 406(3) of the input vector may be freed and reused. Using the newly generated value 408(6), receptive field 409(6) is matrix-multiplied by the first kernel of layer 403 to generate an output value 410(6) for the layer 404. The operational-memory spot for value 408(3) may be freed and reused. Using newly generated value 410(6), the receptive field 411(6) is matrix-multiplied by the first kernel of layer 404 to generate an output value 412(6) for the layer 405. The operational-memory spot used by the value 410(3) may be freed and reused. The previously generated value 412(5) (now illustrated in a lattice pattern) may be written to the holding memory and the corresponding spot in the operational memory may be freed and reused.

In a subsequent nth stage of processing DCN 401($n$), where n>6, an nth element 406($n$) of the input vector for the layer 402 is read into the operational memory to form the receptive field 407($n$), which is matrix-multiplied by the first kernel of layer 402 to generate an output value 408($n$) for the layer 403. The operational-memory spot for the element 406($n$-3) of the input vector may be freed and reused. Using the newly generated value 408($n$), receptive field 409($n$) is matrix-multiplied by the first kernel of layer 403 to generate an output value 410($n$) for the layer 404. The operational-memory spot for value 408($n$-3) may be freed and reused. Using newly generated value 410($n$), the receptive field 411($n$) is matrix-multiplied by the first kernel of layer 404 to generate an output value 412($n$) for the layer 405. The operational-memory spot used by the value 410($n$-3) may be freed and reused. The previously generated value 412($n$-1) may be written to the holding memory and the corresponding spot in the operational memory may be freed and reused.

If element 406($n$) is the final element of the input vector for the layer 402, then subsequently, all the remaining operational-memory spots used by layers 402, 403, 404, and 405 may be freed and reused, with the generated value 412($n$) of layer 405 first written to the holding memory. As can be seen, in this illustrative example, the processing of the input vector to layer 402 to generate the values for layer 405 requires (1) reading from the holding memory only the elements of the input vector, as well as the weights for the kernels of layers 402, 403, and 404, (2) writing to the holding memory only the calculated values of layer 405, and (3) keeping in the operational memory, during the processing, only the weights of the kernels for the layers 402, 403, and 404, the values in the receptive fields 407, 409, and 411, and the corresponding value 412.

In comparison, using conventional methods of processing DCN 401 layer by layer would require many more read and write operations and a much larger operational memory. Specifically, conventional processing would require reading from the holding memory all the elements of the input vector to layer 402 along with the corresponding kernel weights, storing all of them in the operational memory, writing all of the elements of layer 403 to the holding memory, then reading from the holding memory all of the elements of layer 403, along with the corresponding kernel weights, storing all of them in the operational memory, then writing all of the elements of layer 404 to the holding memory, then reading from the holding memory all of the elements of layer 404, along with the corresponding kernel weights, storing all of them in the operational memory, then writing all of the elements of layer 405 to the holding memory.

Using depth-first convolution, one may simultaneously process as many layers as allowed by the size of the operational memory. The number may be predetermined or may be dynamically determined using a so-called greedy algorithm, wherein after operational memory is reserved for a layer's receptive fields and weights, it is determined whether the operational memory can support the next layer's receptive fields and kernels and, if so, then that next layer is added to the depth-first convolution. If not, then the calculated values for that next layer may be written to the holding memory for further processing after completion of the ongoing depth-first convolution process. Whatever the number of layers processed simultaneously or however that number is chosen, the last layer of the depth-first layer set, whose values get written out to the holding memory, may be referred to as the cut-off layer. In the above-described implementation of the DCN 401, the cut-off layer is the layer 405.

Note that using stride lengths greater than 1, having multiple channels in a layer (e.g., using multiple filters), or processing multi-dimensional tensors will change the corresponding number of elements that will need to be stored in the operational memory, however the overall methodology—performing convolutional and other operations in subsequent layers while still processing the current layer—will remain substantially the same.

In one embodiment, layers 402, 403, 404, and 405 may correspond, respectively, to layers 232, 218, 220, and 224 of FIG. 2D, where layers 402, 403, and 404 are convolutional layers and the input tensors and kernels are two-dimensional arrays. In this embodiment, FIG. 4 may be viewed as showing a cross-section of the layers 402, 403, 404, and 405, where the convolving process may be visualized as an elongated wedge having a first cross-section in the form of a two-dimensional cone or funnel and a second cross-section in the form of a trapezoid, where the receptive field may be a stretched receptive field, as described below.

Figure 5:
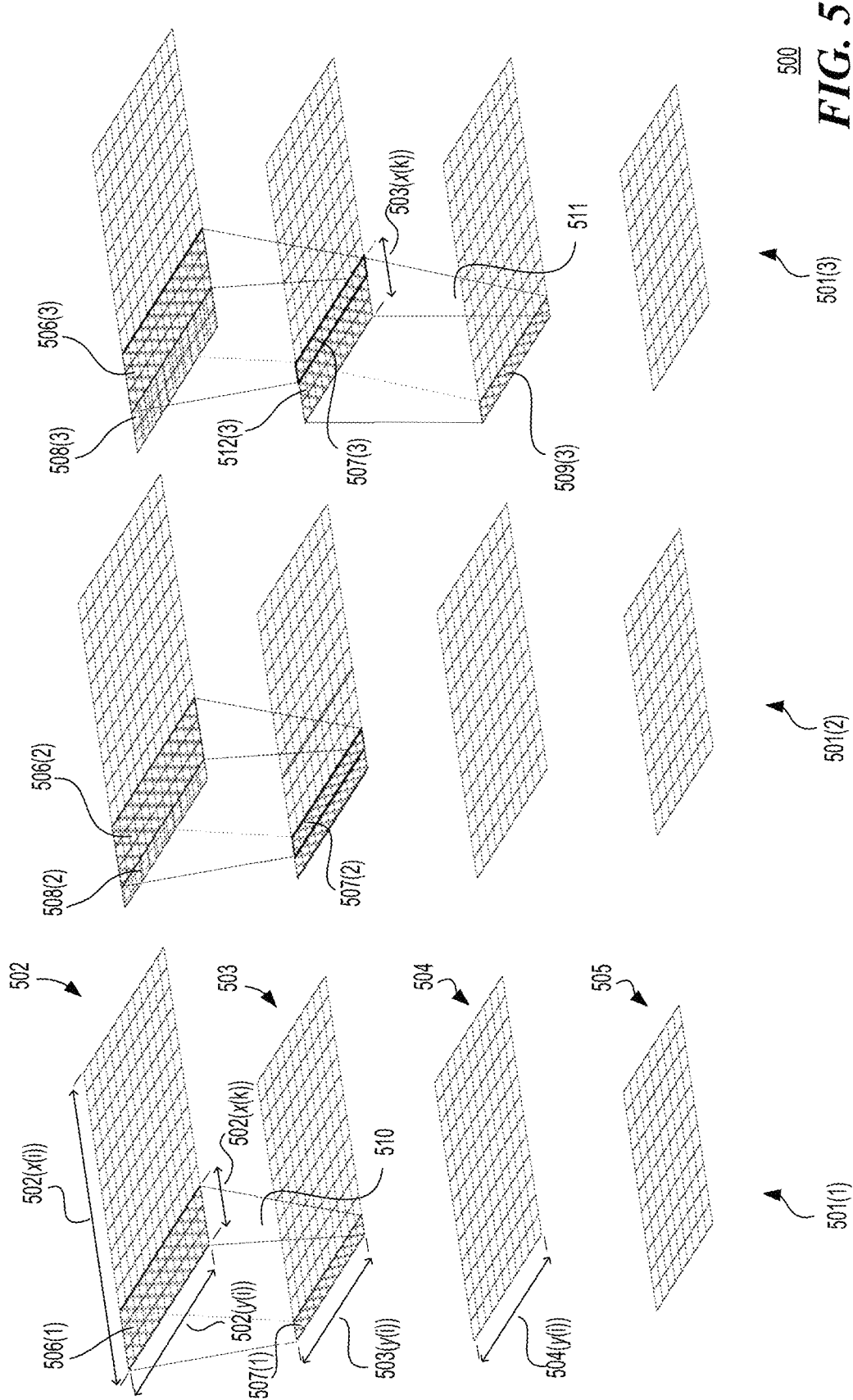
FIG. 5 is an illustration of an exemplary progression of several stages of depth-first convolution processing of 2-dimensional convolutions layers in a DCN in accordance with another embodiment of this disclosure.

FIG. 5 is an illustration of an exemplary progression 500 of several stages of depth-first convolution processing of 2-dimensional convolutional layers in an exemplary DCN 501. The DCN 501 comprises three convolutional layers 502, 503, and 504, and a fourth layer 505, where the four layers may, for example, correspond, respectively, to the layers 232, 218, 220, and 224 of the network 200 of FIG. 2D or the layers 356(1)-(3) and 362(1) of the network 350 of FIG. 3. Note that the DCN 501 may have intervening non-convolutional layers (not shown), such as, for example, non-linearity, normalization, and/or pooling layers, between any two sequential convolutional layers.

Each convolutional layer receives an input tensor having a length x(i) and width y(i) and uses kernels having a length x(k) and width y(k). Note that length x and width y are used herein as a shorthand of convenience for a first dimension of a tensor and an orthogonal second dimension of a tensor and do not represent physical measurements. While in conventional convolutional processing, the input tensor is processed using receptive fields having the same dimensions as the kernel, the DCN 501 uses stretched receptive fields having a length x(k) and a width y(i). In other words, the stretched receptive fields of a layer of the DCN 501 have the same length as the corresponding kernels and the same width as the corresponding input tensor. Note that, for any particular layer, the length and width axes may be selected such that the length x(i) is greater than or equal to the width y(i). As shown in FIG. 5, the first layer 502 receives an input tensor whose length $502(x(i))$ is 15 and width $502(y(i))$ is 13 (i.e., 15—13), uses kernels (not shown) of length $502(x(k))$ 3 and width 3 (i.e., 3×3), and a stretched receptive field 506 of length $502(x(k))$ 3 and width $502(y(i))$ 13 (i.e., 3×13).

In a first stage of processing DCN 501(1), $502(x(k))\times502(y(i))$, in other words 3×13=39, elements of an input tensor are retrieved from a holding memory into an operational memory to form the receptive field 506(1). The receptive field is convolved with a first kernel of the layer 502 to generate an input strip 507(1) for a second-layer input tensor for layer 503. The input strip 507 (1) is in the form of an 11-element vector, or a matrix having a length of one and a width $503(y(i))$ of 11. As can be seen, the generation of an input strip 507 from a receptive field 506 may be visually represented as a wedge 510 whose base is the receptive field 506 and whose apex is the strip 507.

In a second stage of processing DCN 501(2), a strip of width $502(y(i))$, or 13, of additional elements of the input tensor are retrieved from the holding memory to form, together with some of the previously retrieved elements, stretched receptive field 506(2). The stretched receptive field 506(2) is convolved with the first kernel of the layer 502 to generate an input strip 507(2) for the first second-layer input tensor for layer 503. The operational-memory spots used by element strip 508(2) of the input tensor for the layer 502 may be freed and reused since those value will not be needed for any future convolutions. It should be noted that the above-referenced operational-memory spots, as well as any others, may be freed as soon as the corresponding calculations for the previous stage are completed and before additional elements of an input tensor are retrieved from the holding memory.

In a third stage of processing DCN 501(3), another $502(y(i))$, or 13, additional elements of the input tensor are retrieved from the holding memory to form, together with some of the previously retrieved elements, a receptive field 506(3), which is convolved with the first kernel of the layer 502 to generate an input strip 507(3) for the first second-layer input tensor. The operational-memory spot used by element 508(3) of the input tensor for the layer 502 may be freed and reused.

The convolutional layer 503 uses 3×3 kernels and, accordingly, a stretched receptive field 512 having a length $503(x(k))$ of 3 and a width $503(y(i))$ of 11 (i.e., 3×11). By the third stage of processing DCN 501(3), all the elements for stretched receptive field 512(3) have been generated and, consequently, receptive field 512(3) may be convolved with a first kernel of layer 503 to generate an input strip 509(3) for a third-layer input tensor for layer 504. The input strip 509(3) is in the form of an 11-element vector, or a matrix having a length of one and a width $504(y(i))$ of 11. Note that the convolution of the layer 503 may involve the use of padding (not shown) to generate an output for the layer 504 having the same dimensions as the input of layer 503 (rather than the smaller output that would result if no padding were used).

In a subsequent stage (not shown), the memory spots used by no-longer needed element strips of the layer 503 will have been freed and reused in the same way as described above in reference to the layer 502. In further subsequent stages, the same will also apply to the layer 504, once it has enough input elements to populate an entire stretched receptive field (not shown) and provide values for the input tensor for the layer 505. Note that the values for the input tensor for the layer 505 may be written out to the holding memory if, for example, there is insufficient operational memory to store it. The convolutional layers 502, 503, and 504 will continue to convolve their respective input tensors in tandem, until the convolutions of those three layers are complete. The input tensor for the layer 505 may then be read from the holding memory into the operational memory for further processing.

Note that, in some implementations with limited operational memory, multiple corresponding stretched receptive fields, where each is stretched to a fraction of the width of the corresponding input tensor, may be used instead of a single stretched receptive field. This would require some additional processing to appropriately stitch together the fractionally stretched receptive fields, but most of the processing would be as described above in reference to DCN 501 of FIG. 5. Note, that, to the extent that implementations of the disclosure move the sliding stretched receptive field in only one dimension, re-computations of overlapping cones may consequently be avoided.

As noted above, any of the above-described layers may have multiple kernels (e.g., for multiple channels) which would yield multiple corresponding input tensors (e.g., feature maps) for the subsequent layer. The above description describes only a first kernel per layer to simplify the description. A DCN with multiple kernels in a layer would operate, for each kernel, substantially as described above.

Figure 6:
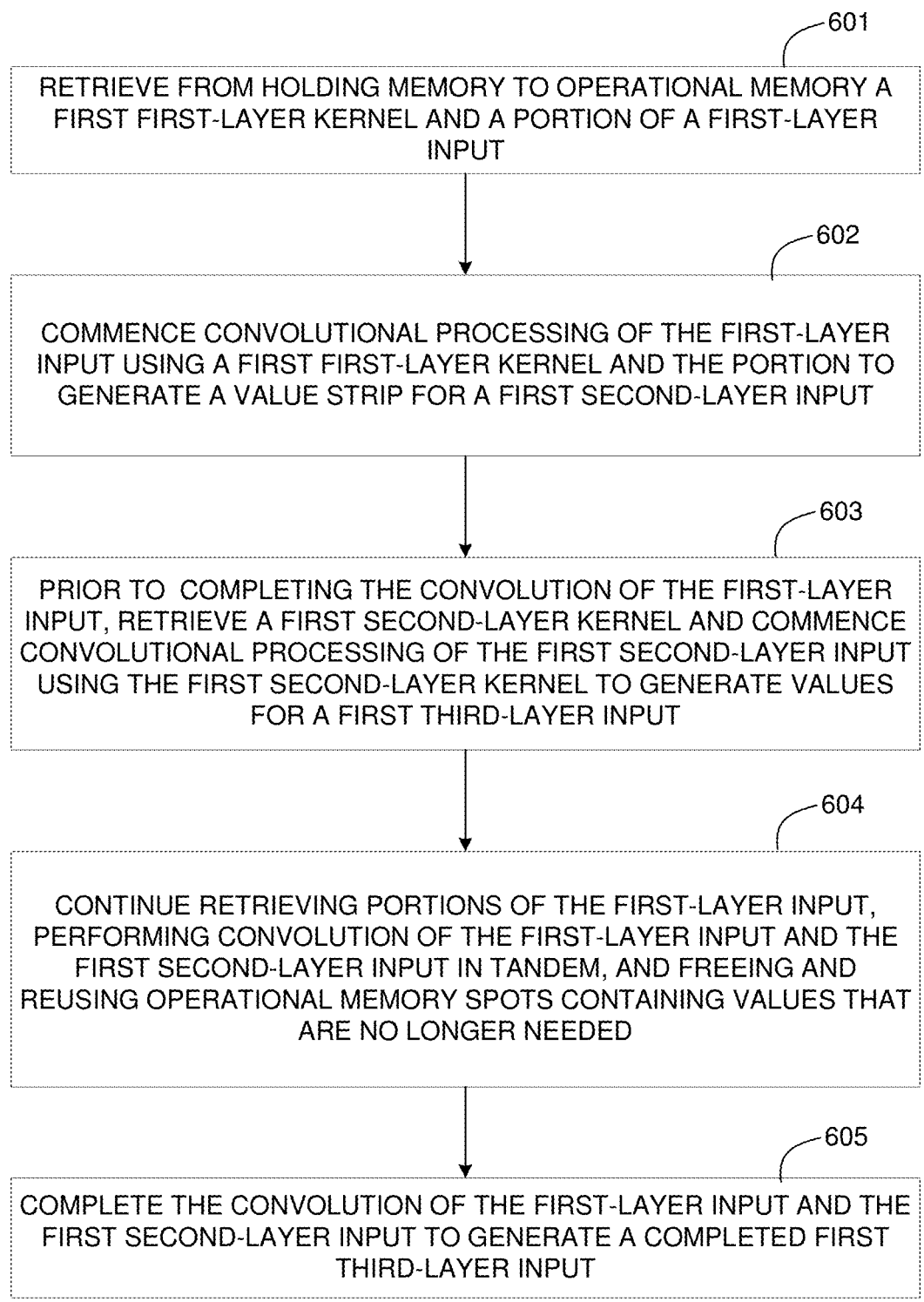
FIG. 6 is a flow chart of an exemplary process in accordance with an embodiment of this disclosure.

FIG. 6 is a flowchart of a process 600 in accordance with an embodiment of the disclosure. The process 600 starts with retrieving from holding memory into operational memory a first first-layer kernel and a portion of a first-layer input (step 601). The process continues with commencing convolutional processing of the first-layer input using the first first-layer kernel and the retrieved portion to generate a value strip for a first second-layer input (step 602). Prior to the completing the convolution of the first-layer input, the process retrieves a first second-layer kernel and commences convolutional processing of the first second-layer input using the first second-layer kernel to generate values for first third-layer input (step 603). The process continues retrieving portions of the first-layer input, performing convolutions, in tandem, of both the first-layer input and the first second-layer input, and freeing and reusing operational memory spots containing values that are no longer needed (step 604). The process continues until the completion of the convolution of the first-layer input and the convolution of the first second-layer input, to generate a completed first third-layer input (step 605).

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computer-implemented method for using a deep convolutional network, wherein the deep convolutional network comprises a first, a second, and a third convolutional layer, the method comprising:
    convolving a first-layer kernel with a first first-layer stretched receptive field of a first input tensor to generate values for a first strip of a second-layer input tensor;
    subsequently convolving a second-layer kernel with a first second-layer stretched receptive field of the second-layer input tensor to generate values for a first strip of a third-layer input tensor; and
    subsequently convolving the first-layer kernel with a second first-layer stretched receptive field of the first input tensor to generate values for a second strip of the second-layer input tensor, wherein:
    the first-layer kernel has a first-layer-kernel length and a first-layer-kernel width;
    the first-layer input tensor has a first-layer-input length and a first-layer-input width;
    the second-layer input tensor has a second-layer-input length and a second-layer-input width;
    the second-layer kernel has a second-layer-kernel length and a second-layer-kernel width;
    the first-layer receptive fields have a length equal to the first-layer-kernel length and a first-layer-stretched-receptive-field width that is greater than the first-layer-kernel width; and
    the second-layer receptive fields have a length equal to the second-layer-kernel length and a second-layer-stretched-receptive-field width that is greater than the second-layer kernel width.

2. The method of claim 1, further comprising:
    convolving the first-layer stretched receptive fields with one or more additional first-layer kernels to generate values for corresponding additional strips of the second-layer input tensor; and
    convolving the second-layer stretched receptive fields with one or more additional second-layer kernels to generate values for corresponding additional strips of the third-layer input tensor.

3. The method of claim 1, wherein:
    the first-layer-stretched-receptive-field width is equal to the first-layer-input width; and
    the second-layer-stretched-receptive-field width is equal to the second-layer-input width.

4. The method of claim 3, wherein:
    the strips of the second-layer input tensor have a length of one and a width equal to the second-layer-input width;
    the third-layer input tensor has a third-layer-input length and a third-layer-input width; and
    the strips of the third-layer input tensor have a length of one and a width equal to the third-layer-input width.

5. The method of claim 1, wherein:
    the deep convolutional network further comprises at least one non-convolutional layer between the first convolutional layer and the second convolutional layer; and
    generating the second-layer input tensor comprises performing operations of the at least one non-convolutional layer in addition to the convolving of the first-layer input tensor.

6. The method of claim 5, wherein the at least one non-convolutional layer comprises one or more of a pooling layer, a non-linearity layer, and a normalization layer.

7. The method of claim 1, wherein:
each kernel comprises a corresponding set of weights;
the method further comprises reading in from a holding memory into an operational memory the weights of the first-layer kernel, the weights of the second-layer kernel; and
convolving the first-layer kernel with the first first-layer stretched receptive field comprises reading from the holding memory into the operational memory values for the first first-layer stretched receptive field without reading into the operational memory all values of the first-layer input.

8. The method of claim 7, wherein:
convolving the first-layer kernel with the first first-layer stretched receptive field is followed by releasing and reusing in the operational memory at least some of the values for the first first-layer stretched receptive field before the subsequently convolving the first-layer kernel with a second first-layer stretched receptive field of the first input tensor.

9. The method of claim 1, wherein:
the third layer is a convolutional layer;
the deep convolutional network comprises zero or more additional convolutional layers configured consecutively following the third convolutional layer for processing simultaneously with the first, second, and third convolutional layers in a set of layers;
the set of layers comprises a cut-off layer.

10. The method of claim 9, wherein the cut-off layer is dynamically determined using a greedy algorithm.

11. A computing device for using a deep convolutional network, wherein:
the deep convolutional network comprises:
a first convolutional layer configured to use a first-layer kernel for convolving a first-layer input tensor to generate a second-layer input tensor;
a second convolutional layer configured to use a second-layer kernel for convolving the second-layer input tensor to generate a third-layer input tensor; and
a third layer configured to receive the third-layer input tensor;
the first-layer kernel has a first-layer-kernel length and a first-layer-kernel width;
the first-layer input tensor has a first-layer-input length and a first-layer-input width;
the second-layer input tensor has a second-layer-input length and a second-layer-input width;
the second-layer kernel has a second-layer-kernel length and a second-layer-kernel width;
the computing device is configured to:
convolve the first-layer kernel with a first first-layer stretched receptive field of the first input tensor to generate values for a first strip of the second-layer input tensor;
subsequently convolve the second-layer kernel with a first second-layer stretched receptive field of the second input tensor to generate values for a first strip of the third-layer input tensor; and
subsequently convolve the first-layer kernel with a second first-layer stretched receptive field of the first input tensor to generate values for a second strip of the second-layer input tensor;

the first-layer receptive fields have a length equal to the first-layer-kernel length and a first-layer-stretched-receptive-field width that is greater than the first-layer-kernel width; and
the second-layer receptive fields have a length equal to the second-layer-kernel length and a second-layer-stretched-receptive-field width that is greater than the second-layer kernel width.

12. The device of claim 11, wherein:
the first convolutional layer is configured to use one or more additional first-layer kernels in the same way as the first-layer kernel to generate values for corresponding additional strips of the second-layer input tensor; and
the second convolutional layer is configured to use one or more additional second-layer kernels in the same way as the second-layer kernel to generate values for corresponding additional strips of the third-layer input tensor.

13. The device of claim 11, wherein:
the first-layer-stretched-receptive-field width is equal to the first-layer-input width; and
the second-layer-stretched-receptive-field width is equal to the second-layer-input width.

14. The device of claim 13, wherein:
the strips of the second-layer input tensor have a length of one and a width equal to the second-layer-input width;
the third-layer input tensor has a third-layer-input length and a third-layer-input width; and
the strips of the third-layer input tensor have a length of one and a width equal to the third-layer-input width.

15. The device of claim 11, wherein:
the deep convolutional network further comprises at least one non-convolutional layer between the first convolutional layer and the second convolutional layer; and
generating the second-layer input tensor comprises performing operations of the at least one non-convolutional layer in addition to the convolving of the first-layer input tensor.

16. The device of claim 15, wherein the at least one non-convolutional layer comprises one or more of a pooling layer, a non-linearity layer, and a normalization layer.

17. The device of claim 11, wherein:
each kernel comprises a corresponding set of weights;
the device is further configured to read in from a holding memory into an operational memory the weights of the first-layer kernel, the weights of the second-layer kernel; and
in convolving the first-layer kernel with the first first-layer stretched receptive field, the device is configured to read from the holding memory into the operational memory values for the first first-layer stretched receptive field without reading into the operational memory all values of the first-layer input.

18. The device of claim 17, wherein the device is configured to, following convolution of the first-layer kernel with the first first-layer stretched receptive field, release and reuse in the operational memory at least some of the values for the first first-layer stretched receptive field before subsequently convolving the first-layer kernel with a second first-layer stretched receptive field of the first input tensor.

19. The device of claim 11, wherein:
the third layer is a convolutional layer;
the deep convolutional network comprises zero or more additional convolutional layers configured consecutively following the third convolutional layer for processing simultaneously with the first, second, and third convolutional layers in a set of layers;
the set of layers comprises a cut-off layer.

20. The device of claim 19, wherein the device is configured to dynamically determining the cut-off layer using a greedy algorithm.

21. A computing device for using a deep convolutional network, wherein:
the deep convolutional network comprises:
a first convolutional layer configured to use a first-layer kernel for convolving a first-layer input tensor to generate a second-layer input tensor;
a second convolutional layer configured to use a second-layer kernel for convolving the second-layer input tensor to generate a third-layer input tensor; and
a third layer configured to receive the third-layer input tensor;
the first-layer kernel has a first-layer-kernel length and a first-layer-kernel width;
the first-layer input tensor has a first-layer-input length and a first-layer-input width;
the second-layer input tensor has a second-layer-input length and a second-layer-input width;
the second-layer kernel has a second-layer-kernel length and a second-layer-kernel width;
the computing device comprises:
means for convolving the first-layer kernel with a first first-layer stretched receptive field of the first input tensor to generate values for a first strip of the second-layer input tensor;
means for subsequently convolving the second-layer kernel with a first second-layer stretched receptive field of the second input tensor to generate values for a first strip of the third-layer input tensor; and
means for subsequently convolving the first-layer kernel with a second first-layer stretched receptive field of the first input tensor to generate values for a second strip of the second-layer input tensor;
the first-layer receptive fields have a length equal to the first-layer-kernel length and a first-layer-stretched-receptive-field width that is greater than the first-layer-kernel width; and
the second-layer receptive fields have a length equal to the second-layer-kernel length and a second-layer-stretched-receptive-field width that is greater than the second-layer kernel width.

22. A non-transitory computer-readable medium comprising instructions that, when executed by at least one processor, cause the processor to perform a method for using a deep convolutional network, wherein the deep convolutional network comprises a first, a second, and a third convolutional layer, the method comprising:
convolving a first-layer kernel with a first first-layer stretched receptive field of a first input tensor to generate values for a first strip of a second-layer input tensor;
subsequently convolving a second-layer kernel with a first second-layer stretched receptive field of the second-layer input tensor to generate values for a first strip of a third-layer input tensor; and
subsequently convolving the first-layer kernel with a second first-layer stretched receptive field of the first input tensor to generate values for a second strip of the second-layer input tensor, wherein:
the first-layer kernel has a first-layer-kernel length and a first-layer-kernel width;
the first-layer input tensor has a first-layer-input length and a first-layer-input width;
the second-layer input tensor has a second-layer-input length and a second-layer-input width;
the second-layer kernel has a second-layer-kernel length and a second-layer-kernel width;
the first-layer receptive fields have a length equal to the first-layer-kernel length and a first-layer-stretched-receptive-field width that is greater than the first-layer-kernel width; and
the second-layer receptive fields have a length equal to the second-layer-kernel length and a second-layer-stretched-receptive-field width that is greater than the second-layer kernel width.

\* \* \* \* \*